July 25, 1944.  D. N. HALSTEAD  2,354,518
COMBINATION CAN OPENER, LID, AND MEASURING DEVICE
Filed Sept. 30, 1941  2 Sheets-Sheet 1
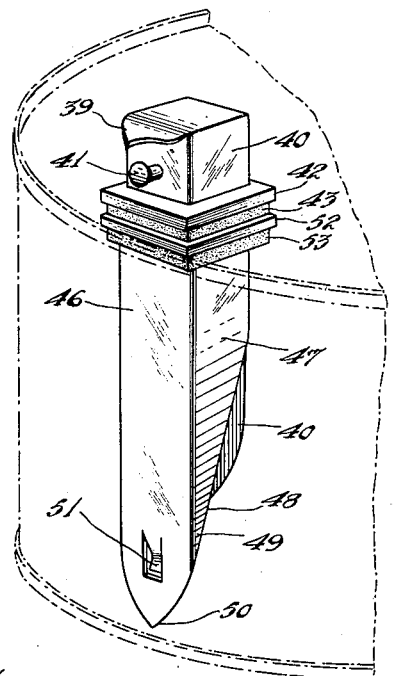
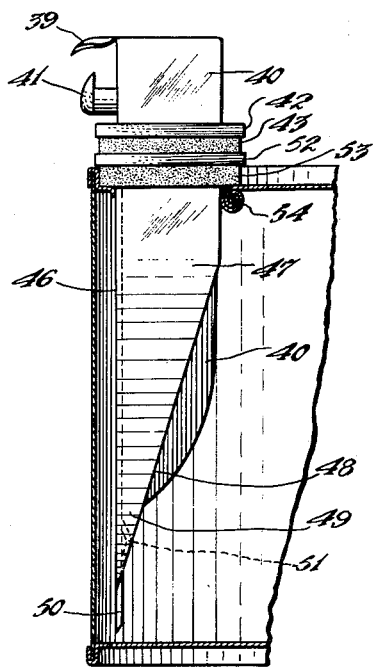
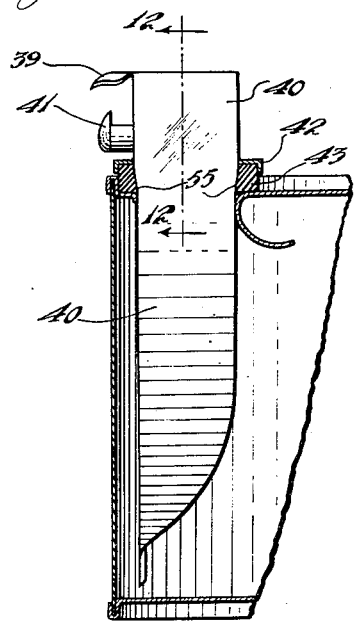
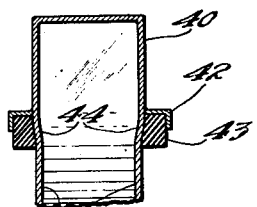
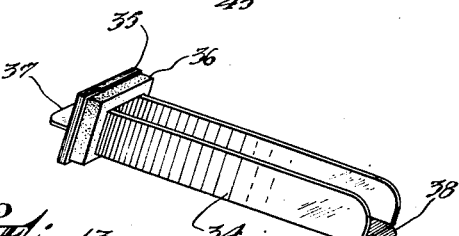
INVENTOR
Dome N. Halstead July 25, 1944.   D. N. HALSTEAD   2,354,518
COMBINATION CAN OPENER, LID, AND MEASURING DEVICE
Filed Sept. 30, 1941   2 Sheets-Sheet 2
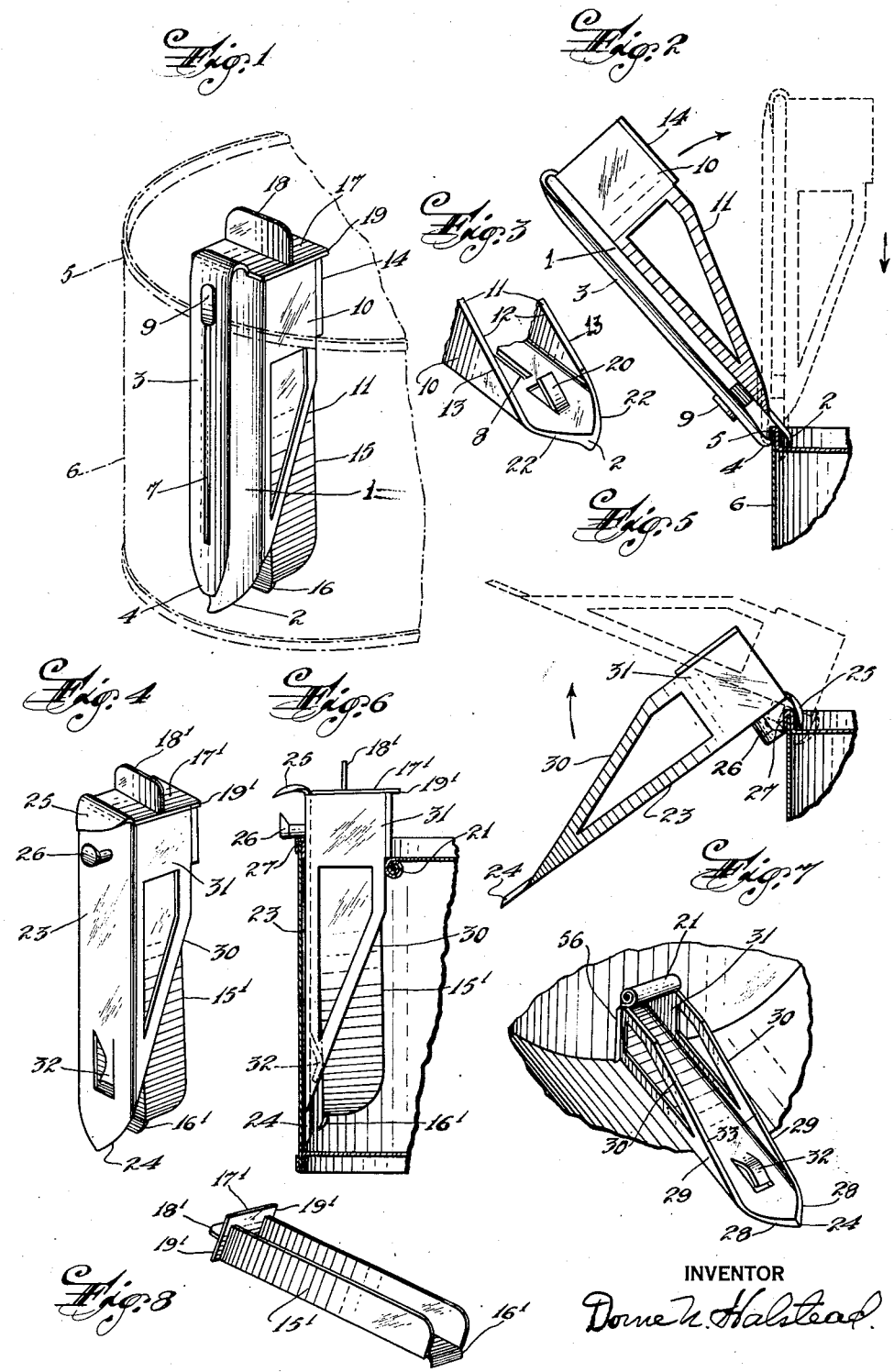
INVENTOR
Donal N. Halstead Patented July 25, 1944

2,354,518

UNITED STATES PATENT OFFICE 2,354,518

COMBINATION CAN OPENER, LID, AND MEASURING DEVICE

Dorne N. Halstead, Upper Montclair, N. J.

Application September 30, 1941, Serial No. 412,939

14 Claims. (Cl. 222—81)

My invention relates to a combination can opener, lid and measuring device which is seal proof, and may be readily applied and removed from cans, particularly coffee cans.

A large portion of the coffees now sold are ground and vacuum packed in cans for the purpose of retaining the original freshness and aroma of the coffee. The cans are seal proof and are opened with considerable difficulty by a key and ribbon arrangement, to provide a lid that may be lifted off the can so that a desired amount of coffee can be dipped out of the can with a spoon or measuring scoop. This method of opening and dispensing the coffee allows a considerable amount of the strength and aroma of the coffee to freely escape when the lid is removed; furthermore, the stirring effects produced by dipping a spoon or scoop into the coffee agitates the coffee in the open air to freely oxidize the essential oils and aroma so that by the time the last portion of the coffee is used it has lost a large portion of its original freshness and flavor.

With the above and other objects in view, one of the primary purposes of my invention is to provide a coffee can opener and dispensing device which may be readily applied and removed from a can, and with which a measured quantity of coffee can be dispensed without unduly exposing the coffee to the open air.

Another object is to provide a can opener with an arrangement whereby a can may be easily pierced so that the opener may be readily pushed into the can to provide it with a measuring and dispensing device.

A further object of the invention is to provide a channel shaped opener adapted to be pushed through the wall of a can with means whereby the cut out tab of the wall will be forced to bend and roll up against the wall of the can to provide an unobstructed passage.

Another object of the invention is to provide an opener having a channel adapted to receive a measuring scoop with an agitating arrangement, whereby the coffee is caused to drop into the scoop when the scoop is slid in and out of the channel way.

Another object of the invention is to provide a measuring scoop arrangement, which may be used in combination with a channel way opener, or may be used alone as a can opener, lid and dispensing device.

These and other objects and advantages are accomplished by the simple and practicable construction and arrangement of parts, hereinafter described and illustrated by the accompanying drawings in which—

Figure 1 is a perspective view of one form of the invention applied to a can, broken off in section;

Figure 2 discloses the opener in one position hooked over the beaded edge of a can and in another position, dotted in, after the opener is rocked to an upright position to pierce the wall of a can shown in section;

Figure 3 is a sectional view of the piercing and wedge shaped end of the channel member;

Figure 4 is a perspective view of another modified form of the invention;

Figure 5 shows the modified form hooked over the beaded edge of a can, and in dotted position after the pointed cutting blade has been made to pierce the can;

Figure 6 discloses the modified form after it has been applied to a can;

Figure 7 is a perspective inside view of the device after it has been pressed into a can with the measuring scoop removed;

Figure 8 is a top perspective view of the measuring scoop;

Figure 9 is a view of another modified form of the invention comprising a channel member and measuring scoop shown applied to a dotted in section of a can;

Figure 10 is a side elevation of the same, applied to a can which is broken off in section;

Figure 11 is a side elevation of the above measuring scoop when used alone as opener and dispensing device;

Figure 12 is a sectional view on line 12—12, Figure 11 showing the tapered enlargement on the side walls of the scoop;

Figure 13 shows a modified measuring scoop similar to Figure 8, with a shoulder and sealing gasket.

Referring to the drawings, numeral 1 indicates the body of the opener which is elongated and channel shaped with a bottom and side walls. The channel member has a pointed curved cutting blade 2, and an integral arm like member 3 spaced from the bottom of the channel. The arm member is convexed in cross section or it may be made channel shape for the purpose of giving it rigidity, and it has a hook like member 4 opposed to the curved piercing end 2, for engaging the beaded edge 5 of the can 6.

The arm member 3 has a longitudinal slot 7, and the base of the channel member has an opposed corresponding longitudinal slot 8. In said slots, a tie member 9 having burred ends is adapted to slide for tieing the arm member 3 to the channel member 1 so as to prevent the same being bent away from the channel member when the hook 4 is placed under the beaded edge 5 of the can, and the channel member then rocked to an upright position as disclosed in Figure 2 to force the pointed cutting blade to pierce or cut an opening in the can, thereby enabling the user to readily push the wedge shaped end of the channel member into the can.

Referring to Figure 3, the side walls 10 of the channel member are cut on an incline 11 towards the pointed end to form substantially a wedge shaped end, the inclined side portions are of sufficient gage and are cut or formed in such a manner as to provide inside rolling surfaces 12 and outside cutting edges 13, for purposes more clearly hereinafter described.

A plate 14 is connected to the upper edges of the side walls of the channel member for providing an enclosed channel way for the measuring scoop 15 to slide in. This plate provides a shoulder to limit the inward movement of the channel when it is pushed into a can as shown in Figure 1. The scoop 15 is substantially the length of the channel member 1, and has the open end of its bottom slightly lipped downwardly at 16 for wiping along the bottom of the channel member to keep it free of coffee granules. Attached to the outer end of the measuring scoop is a lid or plate 17 having a handle 18 and side flanges 19 for lapping over the end edges of the channel member 1 for sealing the same.

Near the pointed end of the channel member 1, there is an upwardly extending projection or arm 20 which may be struck from the bottom of the channel member for the purpose of ensuring the bending and start the rolling of the tab of tin cut by the beveled end and side walls of the channel member. In view of the usual close packing of coffee in the can, this projecting arm is found to be necessary, as the outward pressure and resistance of the coffee prevents the starting of the rolling action of the tab of tin when it is cut. This projecting arm may be extended further than disclosed and when this is done, the rolling action is ensured, even though a thin gauge metal is used for the walls of the channel member. To be most effective, the arm should project slightly below the plane of the inclined surfaces of the side walls. To also start the rolling action of the tab of tin 21 into a roll as shown in Figures 6 and 7, the cutting edge of the end of channel member is beveled upwardly from the cutting edges 22 as disclosed in Figure 3.

To use this form of the invention, the tie member 9, with the scoop removed from the channel, is pushed to the end of the slots near the pointed end of the channel member. The hook 4 is then placed under the beaded edge of the can and the device is then rocked to a vertical position as disclosed in Figure 2 whereby the piercing blade 2 is forced to cut a slot in the top of the can after which the channel member is then pushed down into the can.

As the device is being pushed into the can, the tie member slides along in the slots. It will be noted that the inward movement of the channel member is stopped by the shoulder of the plate 14 contacting with the outside wall of the can.

It is very important that the tab of tin be tightly rolled as it is being cut; otherwise, it is projected out into the coffee shelf like to block the passage of the coffee into the channel way. As herein above stated, the rolling is started by the beveled edges 22 and continued by the projecting arm 20 and the inclined surfaces 12 of the channel member. The arm 20 is shown relatively short, but may be made longer to aid the surfaces 12 on the side walls to roll the tab as it is cut.

The modified form of the invention disclosed in Figures 4 to 7, inclusive, of the drawings has a channel member 23 with a pointed cutting end 24 and at the other end has a curved piercing and slitting blade 25. Opposed to the curved end and on the bottom of the channel member is a hook like stud member 26 for engaging the beaded edge 27 of a can, as disclosed in Figure 5, so that the channel member and curved piercing blade 25 can be rocked there-around to cut a slit or opening in the top of a can. In this form of the invention, the wedge shape end is used as a handle and after the opening is cut into the can, the channel member is unhooked from the beaded edge and the wedge shaped end placed in the opening with the open side of channel member facing toward the center of the can. The channel member is then readily pressed or pushed into the can, thereby causing the beveled cutting edges 28 of pointed end 24 and the side cutting edges 29 on the inclined portions 30 of the side channel members 31 to cut and roll a tab and provide a passageway in the can. The tab is rolled by the beveled edges 28 and the inclined projecting arm 32, and the rolling continued by the flat inclined inner surfaces 33 on the inclined portions 30. To aid the rolling action on the inclined surfaces of the side members, the rolling surfaces may be slightly beveled inwardly or cut slightly below the side cutting edges, thereby coming in contact with the cut portion of the tab right after it has been cut, which not only aids the rolling action but also reduces the amount of pressure necessary to push the device into a can.

The channel shaped measuring scoop 15' with this form of the invention is substantially the same as in the first modification, and has an end member 17' with a handle 18' and side sealing shoulder or flange 19'. It also has the downwardly curved lip portion 16' for wiping the coffee granules up from the bottom of the channel scoop. A modified form of scoop 34 is disclosed in Figure 13, having a flanged or shouldered end 35 with a gasket 36 seated therein for sealing the passageway. This form also has a handle 37 and a downturned lip 38 at its inner end for wiping the bottom of the channel way.

It will be noted that, with this modification of the invention, the rolling finger 32 is inclined upwardly from the base portion, which causes the inner end of the measuring scoop to be projected upwardly into the coffee to agitate the same when the lip contacts therewith. This agitation is found to be highly beneficial, as it is noted that the sharp cutting of the granules of coffee cause them to lock together to cause a tunneling action when the scoop is pushed into the can and then removed. The sharp upward thrust of the scoop and its side members, when engaging and sliding up over the inclined base of the projecting arm, breaks into the coffee and causes the granules to drop into the scoop.

To use this form of the invention, the wedge shape end of channel member is used as a handle, the measuring scoop is removed and the hook 26 is placed under the beaded edge 27 of the can and the channel member rocked therearound, thus causing the curved pointed blade 25 to cut a slit or opening in the can. The channel member is then unhooked from the bead and the pointed end 24 with its beveled cutting edges 28 is placed in the opening that has been cut, after which the channel member is pushed inwardly to cut a tab and opening, and as the tab is cut, it is rolled against the side of the can as hereabove described.

In either of the above modifications, the measuring scoop may be any suitable length for taking out a desired measured amount of coffee for either one or two cups of coffee, and for more cups of coffee, two or more scoops of coffee may be taken out. To ensure that the scoop is fully loaded to its handle end, the scoop is fully pushed in and then partially taken out and then pushed in again. The lower edge of rolled tab strikes it off on the top, and ensures a measured amount, which is very essential in making tasty coffee.

In the modified form of invention disclosed in Figures 9 to 12, inclusive, a piercing blade 39 is carried on the closed end of the measuring scoop 40, which has a hook 41 opposed to the blade carried on the bottom of the scoop. The scoop has a flanged shoulder 42 in which is seated a soft rubber gasket 43, which fits over a tapered enlargement 44 and 55 on the side walls 45 of the scoop, as disclosed in Figures 11 and 12, for purposes more fully herein-after described.

As disclosed in Figures 9 and 10, this scoop is adapted to slide in a channel shaped member 46, having side walls 47, with a wedge shaped end 48, which has side cutting edges 49 and a pointed end 50. On the bottom of the channel member at its wedge shape end, there is a curved arm 51 projecting up into the channel way. The other end of the channel member has a flange shoulder 52, in which is seated a soft rubber sealing gasket 53.

When using the above measuring scoop in combination with the channel member, the measuring scoop with its cutting blade 39 and hook member 41 is hooked on and rocked around the beaded edge of a can to pierce an opening in the wall of the can, as disclosed in Fig. 5. The wedge shape end of the channel member 46 is then placed in the opening and the channel member is then pressed into the can so that the gasket 53 seats against the wall of the can to ensure the seal proofing of the same.

The measuring scoop 40 with its closed end is then slid into the channel member so that its gasket 43 seats against the shouldered end of the channel member 46, thereby providing the can with a seal proof lid and measuring scoop. When the scoop is pushed into the channel member and taken out, it will be filled with a measured quantity of coffee. It will be noted that, when this combination is used, the projecting arm 51 and the inclined rolling surfaces on the side walls of the channel member 46 ensures the rolling of the tab of tin 54 against the wall of the can, as disclosed in Figure 10.

When the measuring scoop 40 is used alone as an opener, lid and dispensing device, a slot is made in the can by rocking the hook 41 and piercing blade 39 around the beaded edge of a can. The pointed wedge shape end of the measuring scoop, which has cutting edges thereon, is then placed in the opening and forced into the can far enough to compress the soft rubber gasket so that the tapered enlargements 44 on the side walls slightly enlarges the opening. Corresponding tapered enlargements 55 on the upper edges of the side walls of the scoop extend the rolling of the tab and thereby slightly enlarge the opening at its upper side so that, with the side enlargements, there is no binding action on the scoop. As ordinarily used after an opening has once been made, the soft rubber gasket prevents the scoop from sliding into an objectionable binding engagement with the sides of the opening and also provides a seal proof lid for the opening.

It will be noted in Figure 11 that when the measuring scoop is used as an opener, lid and measuring device, and since it does not have a rolling arm projecting up into the channel way at the wedge shape end, the tab of tin is not rolled up against the wall of the can, but bent out into the coffee in such a way as to provide a shelf to prevent the coffee from freely falling down and out of the opening when the scoop is loaded and taken out of the opening. The usual practice is to make an opening in the end wall of the can and then to hold the can so that said wall is more or less in a vertical position when dispensing the coffee, and consequently said tab shelf prevents the coffee above the opening from falling freely down and rolling out of the opening. It will be seen that, when the measuring scoop is used alone without the channel member 46, there is no side channel member obstructing the coffee, and thus the end of the measuring scoop feeds directly into the body of the coffee to freely load the same.

In using any of the above modifications of invention, it is not absolutely necessary to use the hook and piercing blade arrangement for puncturing the can, as the pointed ends of the channel members may be made with sufficient force to pierce the walls of cans so that the channel members can be pushed thereinto; however, when a preliminary slit or opening is made, relatively much less pressure is necessary in order to push the channel member into a can.

The channel members in all the modifications preferably have a slight taper towards their pointed ends, which causes a slight inward bending or beading 56 of the tin, as shown in Figure 7, around the channel members as they are pushed into the can, thereby providing a tight seal around the channel members.

Both the channel member and the scoop are made of metal, the scoop may be a thinner gauge than the channel member, which is made of metal having sufficient hardness to give it a good cutting edge and a gauge or thickness sufficient to give it rigidity and wall surface thick enough so that its side inclined surfaces will effectively roll the tab of tin as it is being cut.

It will be noted that the channel shape members are of sufficient length so that they can be readily grasped to function as handle members, particularly in regard to the modifications of the invention having the hook and piercing blade combination, which are rocked around the bead of a can to pierce the same for the preliminary openings.

My invention has been described as particularly useful in opening coffee cans and dispensing a measured quantity of coffee; however, it may be used for opening containers in general, having rigid or semi-rigid walls such as pasteboard containers and the like, and dispensing measured quantities of the contents thereof.

I claim:

1. In a combination can opener and measuring device, comprising a channel shaped member having a passageway, said channel member having one end wedge shape with cutting edges thereon, whereby the channel member will cut through the side of a can when pressed thereagainst, said channel member being slightly tapered to the wedge shaped end, a channel shaped measuring scoop adapted to slide in said channel shaped member, said measuring scoop having one end closed, and means on said closed end for sealing the passageway, said measuring scoop being tapered from the closed end to its other end to form fit the channel member.

2. In a combination can opener and measuring device, comprising a channel shaped member having a passageway therein, said channel member having cutting means on the end thereof for cutting through the wall of a can when pressed thereagainst, a channel shaped measuring scoop adapted to slide in said passageway, said measuring scoop having one end closed and a down turned lip on the bottom of the other end thereof adapted to wipe the bottom of the said passageway.

3. In a combination can opener and measuring device, comprising a channel shaped member having a wedge shaped end with cutting edges thereon whereby the channel member will cut an opening and a tab when pressed against the wall of a can, means on the wedge shaped end for rolling the tab away from the channel member, and a measuring scoop adapted to slide in the said channel shaped member.

4. In a combination can opener and measuring device, comprising a hollow channel shaped member having a wedge shaped end with cutting edges thereon whereby the channel member will cut an opening and a tab when pressed against the wall of a can, an inclined arm on the bottom of said wedge shaped end for bending the tab, a measuring scoop adapted to slide in said hollow channel member, the inner end of said measuring scoop being adapted to engage the said inclined arm when slid inwardly in the channel member whereby it is projected outwardly into the can.

5. In a can opener and dispensing device, the combination of an elongated channel shaped handle member having a wedge shaped end with cutting edges thereon, a curved pointed blade on the other end of the channel member, and a hook like member on the channel member opposed to the pointed blade member adapted to engage the beaded edge of a can, whereby the opener may be rocked there-around by means of the channel handle member to cause the curved pointed blade member to cut an opening in the can, said slit being adapted to receive the wedge shaped end of the channel member whereby it may be readily pressed into the can to provide a dispensing means.

6. In a can opener and measuring device, the combination of a channel shaped handle like dispensing member having a wedge shaped end, a hook like member on the end of channel member adapted to engage the beaded edge of a can so that the opener can be rocked thereon, a piercing member on the channel member opposed to said hook member whereby an opening is made in the can when the opener is rocked on the beaded edge of the can by means of the channel handle member, said opening being adapted to receive the wedge shaped end of the channel member whereby it may be readily pressed into a can to provide a dispensing spout therefor.

7. In a can opener and dispensing device, the combination of an elongated channel shaped handle dispensing member having one end wedge shaped with a piercing blade thereon, an arm on the channel member having a hook like member on the end thereof adapted to engage the beaded edge of a can for rocking the channel member thereon, said hook like member being opposed to the piercing blade whereby a slit is cut into the wall of the can when the opener member is rocked on the beaded edge of the can by means of the channel handle member, said slit being adapted to receive the wedge shaped end of the channel member so that it can be readily pressed into the can to provide a dispensing spout therefor.

8. In a can opener and dispenser, the combination of an elongated channel shaped handle member having one end wedge shaped with a piercing blade thereon, an arm on the other end of the channel member having a hook like member on the end thereof adapted to engage the beaded edge of a can for rocking the channel member thereon, said hook like member being opposed to the piercing blade whereby a slit is cut into the wall of the can, said slit being adapted to receive the wedge shaped end of the channel member so that it can be readily pressed into the can to provide a dispensing passage therefor, said arm having a longitudinal slot therein and a corresponding slot opposed thereto in the channel member, a tie member engaging in said slots adapted to slide therein.

9. In a combination can opener, lid and measuring device, comprising a channel shaped member having a wedge shaped end, a channel shaped measuring scoop adapted to slide in said channel member, said measuring scoop having a closed end and the other end open, a cutting blade on the end of said measuring scoop and a hook like member on the measuring scoop opposed to the cutting blade, adapted to engage the beaded edge of a can whereby an opening is cut in a can when the scoop is rocked thereon, said opening being adapted to receive the wedge shaped end of said channel shaped member so that it can be readily pushed into the can.

10. In a combination can opener and measuring device, comprising a channel shaped member having one end open and the other end wedge shaped with cutting edges thereon, an arm on the wedge shaped end of said channel member extending into the channel portion thereof, a channel shaped measuring scoop adapted to slide in said channel shaped member, said measuring scoop having one end closed and the other end pointed and wedge shaped with cutting edges thereon.

11. In a measuring scoop adapted to slide in guideways and openings comprising a channel shaped member having one end closed, and the other end pointed and wedge shaped with cutting edges thereon, a pointed cutting blade on the end of the channel member, and a hook like member on the channel member opposed to said cutting blade for engaging the beaded edge of a can for piercing an opening in the can.

12. In a combination can opener and measuring scoop comprising a channel shaped member having one end closed and a pointed cutting blade penetratable through the wall of a can on the other end of said channel shaped member whereby it can be pressed into a can to cut a form fitting opening, means on the side of the channel member for enlarging said opening to provide a slide way for said measuring scoop to readily slide in and out the can and to provide a lid for the opening.

13. In a combination can opener and measuring scoop comprising a channel shaped member having one end closed and a pointed cutting blade penetratable through the wall of a can on the other end of said channel shaped member whereby it can be pressed into a can to cut a form fitting opening, enlargements on the side of the channel shaped member tapering towards said pointed blade end for enlarging said opening to provide a slide way for said measuring scoop to readily slide in and out the can.

14. In a combination can opener and measuring scoop comprising a channel shaped member having one end closed and a pointed cutting blade penetratable through the wall of a can on the other end of said channel shaped member whereby it can be pressed into a can to cut a form fitting opening, enlargements on the side of the channel shaped member tapering towards said pointed blade end for enlarging said opening to provide a slide way for said measuring scoop to readily slide in and out the can, and a butting shoulder adjacent said enlargement on the closed end portion of the channel member having a resilient gasket seated thereagainst.

DORNE N. HALSTEAD.